United States Patent
Hing et al.

(10) Patent No.: US 8,304,704 B2
(45) Date of Patent: Nov. 6, 2012

(54) METHOD AND APPARATUS FOR AUTOFOCUS USING A LIGHT SOURCE PATTERN AND MEANS FOR MASKING THE LIGHT SOURCE PATTERN

(75) Inventors: Paul Hing, Owingen-Bilafingen (DE); Sven Hensler, Gaienhofen (DE)

(73) Assignee: Sensovation AG, Stockach (DE)

( * ) Notice: Subject to any disclaimer, the term of this patent is extended or adjusted under 35 U.S.C. 154(b) by 550 days.

(21) Appl. No.: 12/509,595

(22) Filed: Jul. 27, 2009

(65) Prior Publication Data

US 2011/0017902 A1    Jan. 27, 2011

(51) Int. Cl.
*G02B 27/40*    (2006.01)
*G02B 21/00*    (2006.01)

(52) U.S. Cl. .................................. 250/201.3; 359/383

(58) Field of Classification Search .................. 356/123, 356/244, 121, 122, 124.5, 125, 124, 126, 356/127, 609, 624, 399–401; 359/382, 381, 359/383, 368, 904, 559.3; 250/201.2, 201.1, 250/201.3, 559.11, 559.29, 206, 206.1, 214.1, 250/214 R, 216

See application file for complete search history.

(56) References Cited

U.S. PATENT DOCUMENTS

| | | | | |
|---|---|---|---|---|
| 4,958,920 A * | 9/1990 | Jorgens et al. | ............ | 359/392 |
| 5,530,237 A * | 6/1996 | Sato et al. | ............ | 250/201.4 |
| 5,737,084 A * | 4/1998 | Ishihara | ............ | 356/609 |
| 6,008,892 A * | 12/1999 | Kain et al. | ............ | 356/246 |
| 6,043,475 A * | 3/2000 | Shimada et al. | ............ | 250/201.3 |
| 6,091,075 A * | 7/2000 | Shibata et al. | ............ | 250/559.44 |
| 6,130,745 A | 10/2000 | Manian et al. | | |
| 6,838,650 B1 * | 1/2005 | Toh | ............ | 250/201.3 |
| 7,209,287 B2 * | 4/2007 | Lauer | ............ | 359/368 |
| 2003/0112504 A1 | 6/2003 | Czarnetzki et al. | | |
| 2004/0021936 A1 | 2/2004 | Czarnetzki et al. | | |
| 2004/0129858 A1 | 7/2004 | Czarnetzki et al. | | |
| 2007/0102620 A1 | 5/2007 | Bublitz et al. | | |
| 2008/0283722 A1 | 11/2008 | Uchiyama et al. | | |
| 2009/0046298 A1 * | 2/2009 | Betzig | ............ | 356/521 |

FOREIGN PATENT DOCUMENTS

| | | |
|---|---|---|
| DE | 10112639 A1 | 9/2002 |
| DE | 10127284 A1 | 12/2002 |
| EP | 1 775 617 A1 | 4/2007 |
| WO | 0188590 A1 | 11/2001 |
| WO | 2004097493 A1 | 11/2004 |

OTHER PUBLICATIONS

European Search Report dated Sep. 3, 2008.

* cited by examiner

*Primary Examiner* — Thanh Luu
*Assistant Examiner* — Jennifer Bennett
(74) *Attorney, Agent, or Firm* — Laurence A. Greenberg; Werner H. Stemer; Ralph E. Locher

(57) ABSTRACT

An autofocus apparatus and a method achieve a higher level of speed and robustness, and are particularly suited for fluorescence microscopy of biological samples, automated microscopy and scanning microscopy. A high speed is achieved via a light pattern in the sample, detected spatially resolved by a detector generating at least two signals corresponding to a reflex pattern of the light pattern. The two signals are subtracted generating a positioning signal and the focus of the objective in the sample is adjusted depending on the positioning signal.

14 Claims, 3 Drawing Sheets

METHOD AND APPARATUS FOR AUTOFOCUS USING A LIGHT SOURCE PATTERN AND MEANS FOR MASKING THE LIGHT SOURCE PATTERN

BACKGROUND OF THE INVENTION

Field of the Invention

The present invention applies to an autofocus method and apparatus which are precise, reliable and fast, and are particularly suited for microscopes and/or fluorescence microscopy of biological samples. Such autofocus is particularly necessary for automated scanning microscopy which involves high magnification or optical signals from biological samples which may be very small. A biological sample may not be present contiguously, and scanning of large objects in which acquisition of a single image includes a multiplicity of single-field acquisitions is necessary.

It is known that autofocus is commonly performed using two main methods. One is position or distance measurement, involving the reflection of light from a surface of the sample object, with detection schemes based e.g. on intensity, position or interferometry of the reflected light.

The other is analysis of sample content software analysis of images of the sample itself. Such software processing may be based on contrast, resolution, autocorrelation, and phase contrast.

Particularly in the case of microscopy, a sample is formed of sample material or specimen typically mounted on a glass slide, sandwiched between a thin cover glass and the slide. Here position measurement often involves the detection of one or more of the reflective interfaces of the sample. This is typically done by reflecting light off of these interfaces while varying the focus (z-position), and correlating the positions measured with the quality of focus of an image of the sample onto an imaging detector. The reflections from air-glass interface are very strong in comparison with those from glass-specimen interfaces—a factor of 100 or more is not uncommon. However the weak reflections from the glass-specimen interfaces must be detected in many cases, since only these reflect the accurate position of the specimen.

U.S. Pat. No. 6,130,745 describes an autofocus system for micro plates using specular reflection to determine the position of a reference surface—a reflective layer such as the bottom of the micro plate. From this reference surface, the sample is at a known distance.

Although this may work for specimens which are on the order of the 30 to 150 microns mentioned, this has the main disadvantage that for high magnifications (thin specimen such as cells or sub-cellular features, small depth of field), the position of the specimen itself cannot be located and focused on because of mechanical tolerances.

Contrast based autofocus is known, which is based on the principle that the amount of detail in an image is greater when the image is in focus. European patent EP 1 775 617, corresponding to U.S. patent publication No. 2008/0283722, uses a method in which images are recorded while scanning continuously in the Z-direction, and recording focus in both directions. The disadvantages of content-based focusing are the time spent at each X,Y-position, and that weak or missing sample signal will be a problem.

SUMMARY OF THE INVENTION

It is accordingly an object of the invention to provide a method and an apparatus for autofocus which overcome the above-mentioned disadvantages of the prior art methods and devices of this general type, which is a fast apparatus and method for establishing autofocus of a sample for the acquisition of images.

With the foregoing and other objects in view there is provided, in accordance with the invention, a method for performing autofocus. The method includes the steps of emitting light via a light source pattern varying in a direction of an optical axis, focusing the light on a sample via an objective resulting in a generation of a light pattern in the sample, detecting a reflection of the light pattern spatially resolved via a detector, processing outputs of the detector for generating a positioning signal, and adjusting a focus of the objective in the sample depending on the positioning signal.

According to the invention a light source pattern varying in the direction of an optical axis emits light. The light is focused on a sample by an objective generating a light pattern in the sample. The reflection of the light pattern is detected spatially resolved by a detector (generating at least two signals, the two signals) and the outputs of which are processed generating a positioning signal and the focus of the objective in the sample is adjusted depending on the positioning signal.

The present invention performs autofocus at high speed, accuracy and robustness. Accurate position measurement of the Z-position of the sample may be carried out in fast closed loop control via the reflection and/or scatter (hereafter collectively "reflection") of light, especially off of the glass-specimen interface, while advantageously rejecting the strong reflection from the air-glass interface(s).

The light from the light source is focused on the sample by an objective. At least one focus of the objective thus should lie in the sample, whereas the sample may consist of a carrier glass, a cover glass and a specimen sandwiched between the two glasses. Other forms of a sample may be used alternatively containing a specimen, a carrier and—if necessary—a cover.

The light pattern in the sample is preferably a projection or image of the light source pattern at the focal plane or focal planes of the objective or a lens of the objective in the form of a two-dimensional or three-dimensional pattern. The pattern extends in the direction of an optical axis, thus the light intensity of the pattern may vary having two or more maxima in this direction.

The reflected light is monitored by one or a plurality of photoelectric converters. A spatial resolution of the light pattern may be achieved by a plurality of photoelectric converters each one of which sighting for example on one of a plurality of focuses or reflex areas of the light pattern in the sample. An output signal of the detector may contain two or more signals to be transformed into an output signal or positioning signal which represents the degree of focus in real-time. Such positioning signal preferably represents the magnitude and direction of the deviation from ideal or target focus position in the Z-direction i.e. the direction of the optical axis. The autofocus is established by a means of mechanical actuation based on the positioning signal. Reaction times in the millisecond range are possible.

This autofocus system operates preferably independently of the microscope and its related illumination and image acquisition, and preferably continuously throughout the measurement or scanning of the sample. The invention can provide autofocus of any layer of a multi-layered sample.

The preferred reflection of light from the sample is the reflection from an interface of the sample, like a glass-air interface, especially a glass-specimen interface since this represents the exact position of the specimen. The reflection from a glass-air interface can also be used in cases where a known offset and tolerance is adequate enough to focus on the sample. A known therefore more reliable reflective means can be placed in the specimen carrier, preferably close or in contact with the specimen, i.e. a coating of the cover glass on the side of the specimen.

Speed and robustness are increased by optionally additionally employing a means of extending the depth-of-field. Depth-of-field is the position range in the Z-axis in which the image quality (e.g. sharpness) is considered to be acceptable over the entire field of view. Depth of field is extended, for example, by using a phase plate, for example, a wavefront coding plate as described in U.S. Pat. No. 5,748,371. The depth of field is preferably extended such that the number of acquisitions at various Z-positions necessary to acquire the desired thickness of the specimen is minimized or more preferably reduced to one.

Speed and robustness are increased through the optional additional use of a stored three-dimensional contour map of the sample generated from measured data from a pre-calibration combined with mathematical calculation and projection. An accurate prediction of the focus plane location at every X,Y-location is available during scanning and image acquisition of the sample. This pre-calibration preferably is a fast process which takes place before image acquisition in which the reflections from the sample are located at several points of the sample in three-dimensional space. Following this highly accurate contour helps that the previously described reflection autofocus is always within its tracking range, and can perform its fast autofocus reliably. In addition, having a precise predicted focus position with narrow tolerance of where focus must lie, eliminates searching time during data acquisition in the event that tracking is lost, enabling faster decisions.

In a further embodiment of this invention, robustness is increased by the possibility of illuminating the sample with light such that an image can be obtained at the current focus position. This may be preferably a brightfield or fluorescence image, and preferably an image of the specimen itself or portions thereof. The image is detected by an imaging photoelectric detector which may be the same used for the image acquisition. For high speed, a low-resolution, high speed photoelectric converter or alternatively a small sub-area of the larger photoelectric converter is preferably used for image acquisition. This content-based mode is preferably employed only in the event that the reflection signal and tracking thereof is lost or missing during acquisition, and must be found. In the event that the contour map predicting the location of the focal plane is available, the search range can be narrowed such that the decision whether or not the sample is present can be arrived at much faster.

An advantage of the invention is the ability to reliably detect the glass-specimen interface of a mounted sample. A novel scheme allows reliable detection of weak reflections from glass-specimen interfaces. The signal-to-background noise ratio for the weak reflections is increased by eliminating the much stronger direct reflections of other reflective interfaces. Axial rays and those within a certain small numerical aperture—which are not useful for depth position measurement anyway and which cause high background level—may be blocked enhancing the desired weak reflection in a dark, low background.

Another advantage is the high speed or short time required for autofocus. The measurement of a reflected pattern may be operated independently and continuously in parallel with image acquisition. It does not require use of the acquisition camera for autofocus, thus saving time. A positioning signal which may indicate both—magnitude and direction—saves time in a signal processing of an autofocus control loop, with reaction times in the millisecond range. The optional availability of a predicted 3-dimensional focus plane over the entire area of the sample object saves time in tracking. The optional use of depth-of-field extension reduces or preferably eliminates the need for acquiring multiple images in the Z-axis, thereby reducing acquisition time and processing time.

Another advantage is robustness, which may be constituted by a combined use of alternative redundant focusing methods. The main position measurement using reflection and projection of a light pattern in the sample is backed up by the detection of sample content. Therefore the focus plane will be located under all conditions. The use of a multi-dimensional light pattern ensures that the system is less sensitive to local disturbances such as dust, dirt, scratches, and the like. The optional use of depth-of-field extension via phase plate allows more tolerance for the focal plane determination, increasing robustness of the system. It furthermore avoids the need for higher-precision mechanics and optics which are more expensive and more sensitive to shock, vibration, and the like. The availability of an accurately predicted 3-dimensional focus plane over the entire area of the sample object allows an acceptance range to be set for the focus location. Focus error can be detected and corrected in real-time during sample acquisition.

Other features which are considered as characteristic for the invention are set forth in the appended claims.

Although the invention is illustrated and described herein as embodied in a method and an apparatus for autofocus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
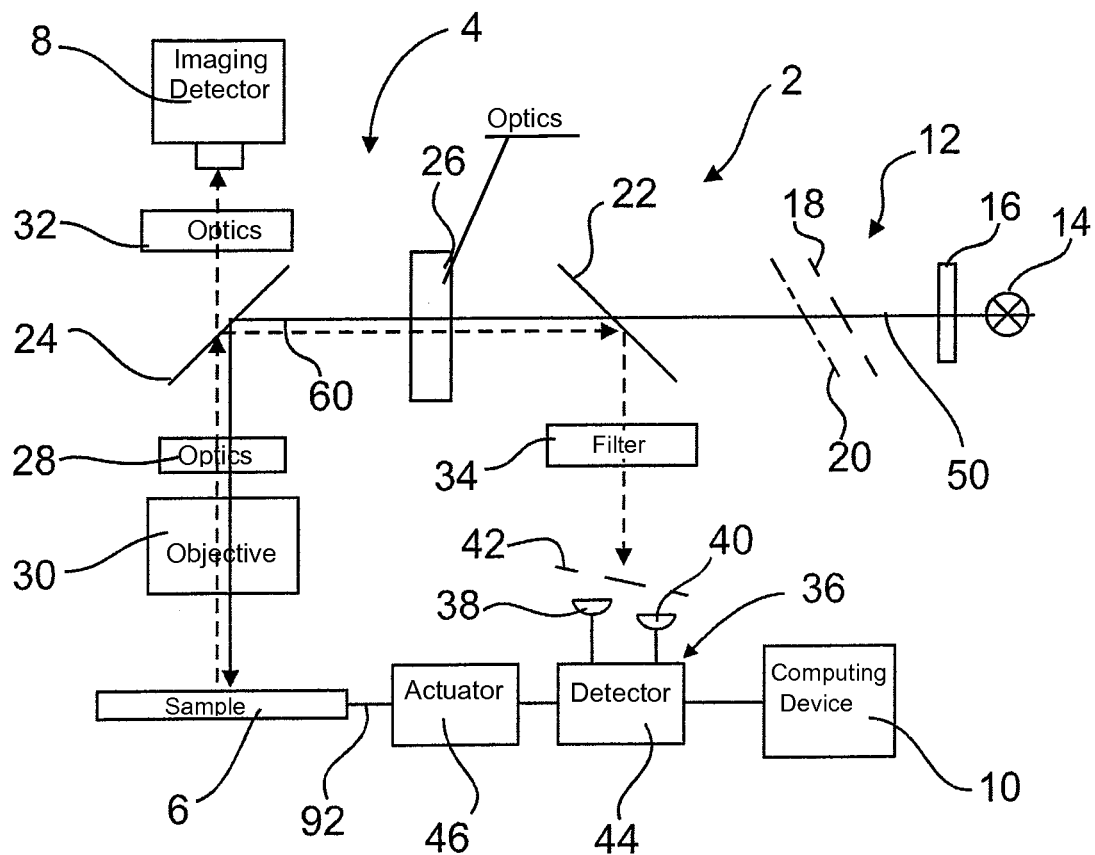
FIG. 1 is a schematic diagram of an autofocus apparatus according to the invention.

Referring now to the drawings of the invention in detail, and in particular to FIG. 1 thereof, there is shown a preferred embodiment of an apparatus 2 for autofocus according to the present invention. The apparatus 2 is integrated into a microscope 4 as shown in FIG. 1 for fluorescent analysis of biological material positioned in a sample 6 using an imaging photoelectric converter (camera) or detector 8 connected to a host computer and is controlled by a computing device 10 which is part of the apparatus 2 for autofocus and the microscope 4.

The apparatus 2 contains a light source 12 with a light source emitter 14, preferably using light emitting diode (LED) technology, an optical system 16 of forming the light from the light source emitter 14, preferably including a light diffusing element, a means 18 of patterning or spatially filtering light generating a light source pattern and a means 20 of spatially filtering light (aperture). The apparatus 2 further contains a first beam splitter 22 and a second beam splitter 24, both may be dichroic mirrors, an optical system 26 of forming the light from the light source 12, an optional optical element 28, preferably a phase plate such as a wavefront coded plate, provides increase of depth of field, and an objective 30 to focus on the sample 6.

Light reflected or emitted from the sample 6—as indicated by broken arrows—passes through the objective 30 and the optical element 28 and may be separated by the beam splitter 24 according to its frequency. Light emitted by the sample 6 by means of fluorescence or other process to be detected by the detector 8 passes the beam splitter 24 and is formed onto the detector 8 by an optical system 32 for forming and focusing the light from the sample 6. Light from the light source 12 may pass the beam splitter 24 too but may as well or alternatively be reflected—depending on its frequency, passes the optical system 26 and is reflected again by the beam splitter 22 and directed towards an optional optical system 34 for focusing the reflected light from the sample 6 onto a detector 36 containing one or a multiplicity of photoelectric converters 38, 40, which may be photodiodes, multi-photodiode arrays, array sensors or part of a camera. A second filter 42 for spatially filtering light serves as aperture of the converters 38, 40.

The photoelectric converters 38, 40 pass their signal to a positioning signal generator 44 for producing a signal or a plurality of signals relating to the distance from the objective 30 to the sample 6. The positioning signal generator 44 is connected to an actuating means 46 of varying position of the sample 6 relative to the objective 30 and is prepared to control the actuating means 46 in order to control the distance. With this process focus onto the photoelectric converters 38, 40 is established. On the other hand the positioning signal generator 44 is connected with the computing device 10 which controls the autofocus process performed by the apparatus 2. The computing device 10 is capable of controlling the actuating means 46 as well and separately.

Figure 2:
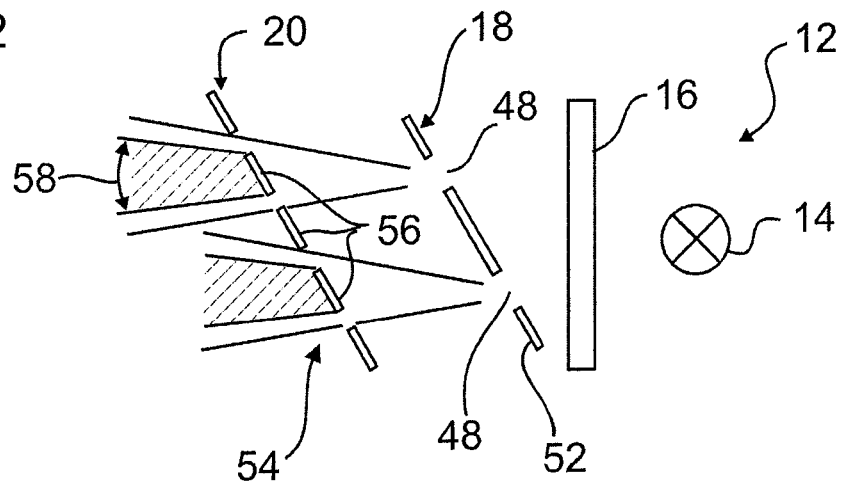
FIG. 2 is a schematic diagram of a light pattern as emitted from a light source.

FIG. 2 shows the light source 12 in greater detail. In the preferred implementation of the apparatus 2, means of patterning 18 spatially filters the light passing through it using a pattern of light transmitting features 48. The light transmitting features 48 may be openings, preferably slits vertical to an optical axis (50), and so forming the light source pattern. The slits are preferably parallel. The preferred implementation uses two slits in a single plate 52. The light transmitting features 48 are located at different positions along the optical axis 50 (FIG. 1). In the case of a single plate 52, the plate 52 is preferably tilted at an angle with respect to the optical axis 50 such that its light transmitting features 48 are at different positions along the optical axis 50.

The aperture forming means 20 of spatially filtering light preferably contains a pattern 54 like one or a plurality of light-blocking features 56 each of which correspond to a light transmitting feature 48. The aperture forming means 20 is positioned relative to means of patterning 18 such that the light from the light transmitting features 48, e.g. slits, which fall within a certain numerical aperture 58 is blocked from getting to the sample 6. Light which is outside of this numerical aperture 58 is formed by the optical system 26 into a beam 60. This beam 60 is reflected by the beam splitter 24, and the objective 30 focuses the light into the sample 6, such that a light pattern 62 in three-dimensional space is induced generating a reflex pattern.

Figure 3:
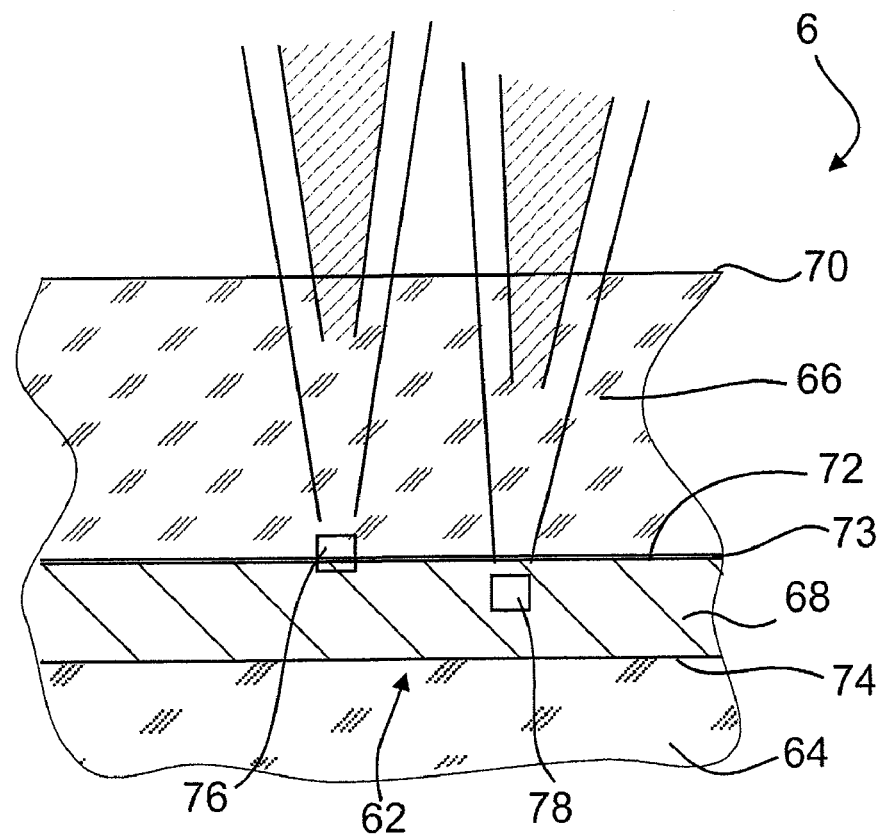
FIG. 3 is a schematic diagram of a light pattern as emitted from a sample.

The light pattern 62 is schematically illustrated in FIG. 3 which shows a detail of the sample 6. The sample 6 contains a sample carrier glass 64 and a cover glass 66 in between both a specimen 68 is mounted, e.g. some biological material. When light falls onto the sample 6 a bright reflex is emitted from a glass-air interface 70 of the cover glass 66. A second reflex may be emitted from the glass-specimen interface 72, however, this second reflex is usually much less intensive than the first reflex, due to a smaller difference in refraction index between the glass 66 and the specimen 68 than between the glass 66 and air. To increase the second reflex a reflective layer 73—which might be as well or alternatively as scattering layer being named as the reflective layer 73 in the following as well—is placed between the carrier glass 64 and the specimen 68 or the cover glass 66 and the specimen 68. A third reflex might result from the glass-specimen interface 74 of the sample carrier glass 64.

Light from the light source 12 falls onto the sample 6 and is partially reflected by the interface 70. Due to the aperture forming means 20 and the blocking of the light which falls within the numerical aperture 58 and is blocked from getting to the sample 6 the direct reflections from surfaces of the sample 6—which are not within the depth of field of the objective 30—are blocked as well. This enhances the signal-to-noise ratio of the reflection from the glass-specimen interface 72 contributing to robustness of the measurement.

The light focused into the sample 10, is focused in a pattern in three-dimensional space forming the light pattern 62 generating the reflex pattern. In FIG. 3 two reflex areas 76, 78 of the light pattern 62 are shown in cross section that are formed in a manner corresponding to the form of the light transmitting features 48. The two reflex areas 76, 78 might be 10 μm×10 μm in size in cross section corresponding to the area of focus of the optics of apparatus 2, and are at different positions in the direction of an optical axis 50 and in X-direction or Y-direction. In FIG. 3 this variation is realized in the X-direction lying in the plane of paper of FIG. 3. Due to the variation in the X-direction the light reflected from the two reflex areas 76, 78 are separately received by the converters 38, 40, converter 38 receiving the light emitted from reflex area 78 and converter 40 receiving light from reflex area 76.

This spatial resolution is advanced by the second means 42 of spatially filtering light which preferably uses a pattern of light transmitting features, preferably parallel slits, corresponding to those of the first means 18 of patterning. The second means 42 may optionally be positioned tilted at an angle with respect to the optical axis 50.

The photoelectric converters 38, 40, which preferably consist of two photodiodes corresponding to the two slits of this embodiment, detect the reflected light. Based on the signals from these photoelectric converters 38, 40, the positioning signal generator 44 creates a signal which represents the current focus position relative to the optimum focus. Such a positioning signal 80 (FIG. 4) may be used for positioning the focus in the sample.

Figure 4:
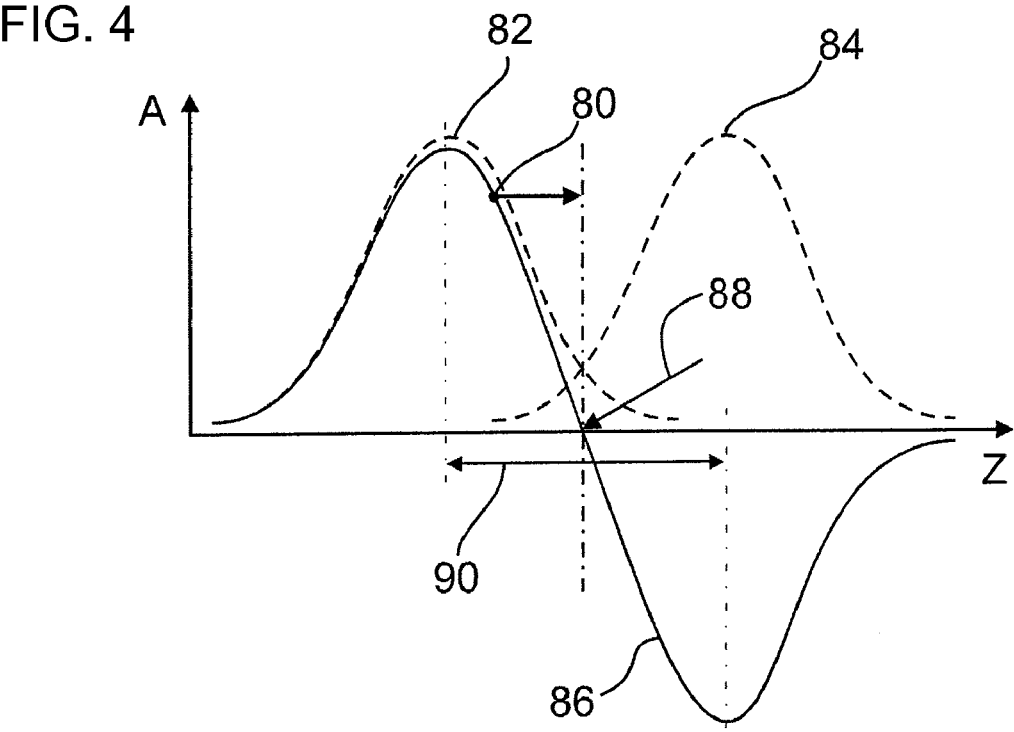
FIG. 4 is a graph showing a positioning signal.

A typical characteristic of the positioning signal 80 for the case of two slits is illustrated in FIG. 4 showing the amplitude A of the signal 80 verses the depth of focus Z. In this case, the positioning signal generator 44 performs the function of subtracting the signals 82, 84 from two photoelectric converters 38, 40, yielding the positioning signal 80 for various positions in Z-direction of the optical axis 50 or focal axis. A signal 80 of positive amplitude is shown with a dot for better understanding.

Due to the variation in the direction of the optical axis 50 the light reflected from the two reflex areas 76, 78 represent different focus depth in the sample 6. In FIG. 3 area 76 covers the glass-specimen interface 72 and receives from there reflected light. In contrast to that area 78 is a distance away from the glass-specimen interface 72 and therefore receives less reflected light. This situation is illustrated with the signal 80 in FIG. 4. The signal 82 is relatively strong whereas signal 84 is rather weak. Subtraction of the signals 82, 84 results in positioning signal 80. If the sample 6 would be moved away and towards the objective 30 the signal 80 would travel along the line drawn through representing a calibration curve 86.

The calibration curve 86 is known, wherein the position of target focus 88 is indicated by the arrow. As long as a measured position is within a control range 90 the signal 80 gives a definite location if the actual focus of the apparatus 2, whereby the positive or negative amplitude of the signal 80 indicates the position below or above the target focus 88 which may be the best or optimal focus.

So the signal 80 may be directly used to control the actuator 46 for varying the position of the sample 6 relative to the objective 30. If the amplitude of the calibration curve 86 is known as well, the amplitude of the signal 80 may be used to directly move the sample 6 in one step into the target focus 88.

This very fast positioning of the sample 6 into the best focus 88 is performed by a fast control loop 92 indicated by broken arrows in FIG. 1 including the detector 36, the positioning signal generator 44, the actuator 46 and the sample 6. The fast control loop 92 is capable of immediately moving to the target focus position 88. If the amplitude of the calibration curve 86 is not known well enough the fast control loop 92 may change the position of the focus in close loop fashion—e.g. by moving the sample 6—in the direction indicated by the signal 80 until the sign of the signal 80 changes from positive to negative or vice versa, indicating the arrival at the target focus position 88.

For this very fast autofocus the signal 80 should be within the control range 90. To ensure that this is the case—at least in most X,Y-scan positions over the sample 6—a pre-scan calibration process is optionally and preferably carried out. In this process a three-dimensional contour prediction of a focus plane 94 of the best focus 88 is generated and stored. The focus plane 94 is shown in FIG. 5.

Figure 5:
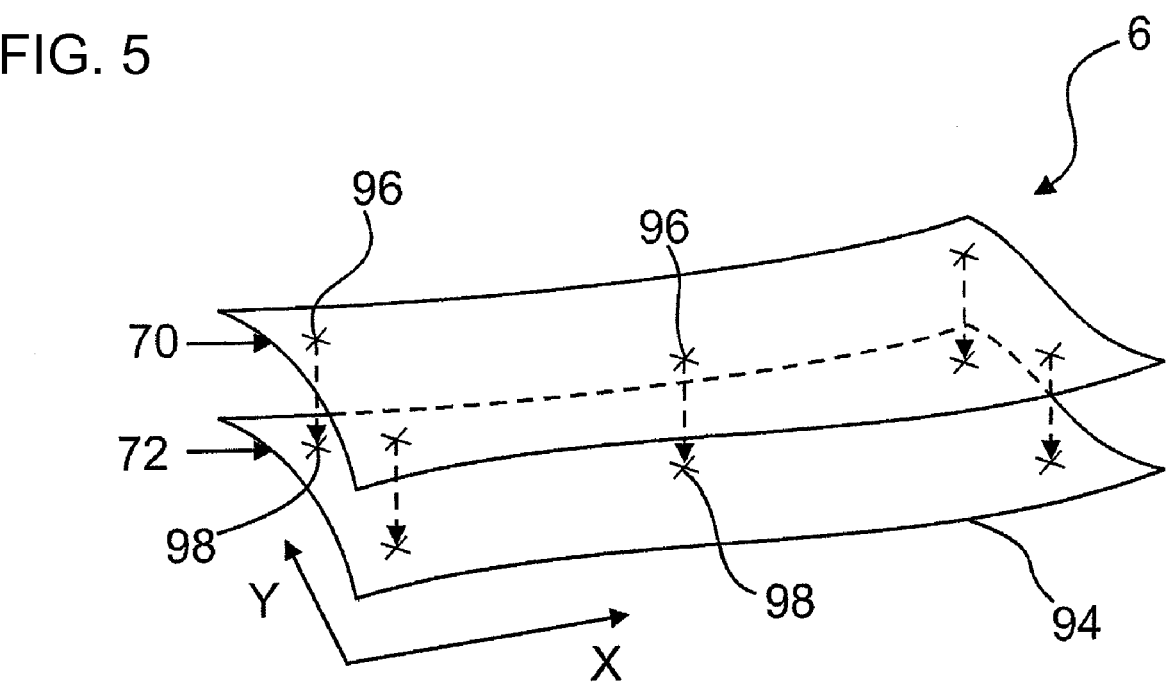
FIG. 5 is an illustration showing a grid of points in 3-dimensional space generated from a pre-calibration.

In FIG. 5 the lower plane represents the focus plane 94 which may coincide with the plane of the glass-specimen interface 72 but may on the other hand be any other plane being advantageous for the autofocus process.

The prediction of the three-dimensional contour of a focus plane 94 is done by measuring a few points of optimal focus (Z-positions) over the sample area to be looked at by the microscope 4, in FIG. 5 five points are shown for illustrating purposes. At these points two reflections 96, 98 are preferably recorded per X,Y position: the first reflex 96 from the cover glass-air interface 70, and the targeted weaker reflex 98 from the glass-sample interface 72. The stronger reflex 96 will easily be found whereas the reflex 98 might be very weak. The thickness of the cover glass 66, for instance 170 µm, may be used to facilitate the search as indicated by the broken arrows in FIG. 5.

In the event that a weaker reflex 98 is not found, the point is not stored and an alternative point is measured. Optionally, the presence and the relationship between the measured characteristics of these two reflections 96, 98 may serve as a diagnostic check. Note that this process is fast because it involves neither image acquisition nor processing. The number of such calibration X,Y-locations is preferably minimized to save time. From the calibration X,Y-locations a prediction of the focus plane 94 is preferably calculated and stored for all X,Y-locations to be acquired during scanning. This pre-scan calibration process serves as an optional diagnostic, in which the sample may be rejected in the event that the process fails.

The scan or image acquisition of the sample by the microscope 4 begins preferably by moving to the first known X,Y-location, and corresponding prediction of optimum Z-position or target focus position 88. The fast control loop 92 of the autofocus is enabled, which will immediately drive the system to target focus position 88 based on the reflection from the glass-specimen interface 72. Preferably this fast control loop 92 remains active from now on in a continuous, independent fashion, keeping the focus optimal as all X,Y-scan positions are acquired. Alternatively or additionally, the fast control loop 92 updates the calculation of the focus plane 94 enhancing the accuracy of the mathematical prediction for future X,Y-positions, for instance at intervals and/or upon command from the computing means 10.

Images are acquired by the detector 8. Optionally, if one or a plurality images are to be acquired above or below the optimum focus position ("Z-stacking"), the fast control loop can be overridden by the computing device 10 which controls the acquisition of such Z-stacking images, referenced from the current optimum focus. After acquiring the Z-stack of images, the fast control loop 92 resumes tracking of optimum focus, and data from the next scan X,Y-position are similarly acquired.

In the event that the control range 90 is exceeded, which may indicate that the reflection signal is lost, the computing device 10 can optionally switch to a content-based method of finding focus position based on an output from the detector 8. After finding the target focus position and acquiring image(s), the scan of the sample continues using autofocus by position measurement. Although this alternative content-based method is slower, it is preferably used in case of failure of the position measurement, and provides quicker recovery than alternative methods without losing data or causing abortion of the sample scan.

In a further embodiment of the apparatus, the mechanical accuracy and precision of X, Y and Z actuation is such that after movement to the predicted focus (Z) position of any X,Y-position the positioning signal 80 always lies within the control range 90. This means that the fast control loop 92 can move directly to optimum focal position 88 without further searching.

In a further embodiment of the apparatus, the means of patterning 18 may be formed of a single or a plurality of such targets, whereby each target may spatially filter the light passing through it using a different pattern of light transmitting features.

In a further embodiment of the invention, an equivalent light source for generating a patterned light source or light source pattern may replace the light source 12. Replacement light sources include, but are not limited to, an LED array or OLED matrix.

In a further embodiment of the apparatus 2, since the reflected light is in the form of an image, the positioning signal generator 44 produces signals representing the current focus position relative to the target focus 88 for a plurality of regions within the current field of view. This may be done with the aid of the X,Y-resolution of the reflex areas 76, 78. In this case, more information about the tilt and contour of the focus plane is available, allowing optional decisions by the computing means 10 for further optimizing the focus. The information also can be used for more precise prediction of the following focus position.

In a further embodiment of the apparatus, there is also the capability to perform a fast version of content-based autofocus. This additional capability is advantageous since it provides fast recovery in case of failure of the primary position-based autofocus during the acquisition of the sample. The light source 12 in this case can be so configured by the computing device 10 such that it illuminates the sample with such a profile and wavelength that the imaging detector 8 can record a brightfield image of the sample 6, regardless of the presence of optical filters in the system. Furthermore, the imaging detector 8 preferably possesses a fast, low-resolution mode of operation ("fast mode") in which it can use a subset ("region-of-interest", or "sub-area") of its photoelectric conversion elements ("pixels"). The detector 8 generates an output representing a small image at a higher rate than its full resolution mode. Preferably, the output of the detector 8 represents a focus score, derived from the said small image. The output is preferably a separate additional output of the imaging detector 8 which is dedicated to this autofocus function. The computing device 10 receives the output from the detector 8, and together with its capability of controlling the actuator 46 finds the target focus position 88 based on the focus score or the characteristics of the content of the small images.

The invention claimed is:

1. A method for performing autofocus, which comprises the steps of:
   performing one of patterning and spatially filtering light from a light emitter of a light source resulting in a generation of a light emitting light source pattern varying in a direction of an optical axis;
   masking the light emanating from the light emitting light source pattern with a minimum numerical aperture by a means for masking so that the light from each light source of the light emitting light source pattern which falls within the minimum numerical aperture is blocked from getting to a sample, and direct reflections from surfaces of the sample, which are outside a depth of field of an objective, being blocked as well;
   focusing the light on the sample via the objective resulting in a generation of a light pattern in the sample containing reflex areas at different positions in a direction perpendicular to the optical axis and further at different positions in the direction of the optical axis, thus a light intensity of the light pattern varies having at least two maxima in the direction of the optical axis;
   detecting a reflection of the light pattern spatially resolved via a detector;
   processing outputs of the detector for generating a positioning signal; and
   adjusting a focus of the objective in the sample depending on the positioning signal.

2. The method according to claim 1, which further comprises using a reflex from an interface of the sample from the light pattern to generate the positioning signal.

3. The method according to claim 1, wherein the light pattern is positioned on both sides of a glass-specimen interface of the sample to generate the positioning signal.

4. The method according to claim 1, wherein a positioning of the light pattern is guided by a pre-calibration.

5. The method according to claim 1, which further comprises performing a pre-calibration, in which a predicted target focus position is generated for a number of positions on the sample.

6. The method according to claim 1, which further comprises storing a grid of points in 3-dimensional space, each of the points representing a location of a reflective interface of the sample.

7. The method according to claim 1, which further comprises carrying out a content-based autofocus with an imaging detector if a result of the autofocus based on the light pattern is below a predetermined level.

8. The method according to claim 7, wherein the imaging detector contains an imaging detector area whereby a content-based autofocus is carried out only with a sub-area of the detector area.

9. The method according to claim 6, wherein the reflective interface of the sample is a glass-specimen interface.

10. An apparatus for autofocus, the apparatus comprising:
    an objective for focusing on a sample;
    a light source with a light emitter for sending light through said objective to the sample;
    a first optical system generating a light source pattern by one of patterning or spatially filtering the light from said light emitter, said light source pattern being a light emitting light source pattern varying in a direction of an optical axis, said first optical system having means for masking the light emanating from said light source pattern such that the light from each light source of the light source pattern falling within a minimum numerical aperture being blocked from getting to the sample, direct reflections from surfaces of the sample, being outside a depth of field of said objection, being blocked as well;
    a second optical system for projecting said light source pattern at a focus of said objective to generate a light pattern in the sample; and
    a detector with an optical system for spatially resolved detection of the light pattern.

11. The apparatus according to claim 10, wherein said light source pattern contains a two-dimensional target having openings formed therein and tilted towards the optical axis, wherein said openings include at least two lit slits in said two-dimensional target vertical to the optical axis.

12. The apparatus according to claim 10, further comprising:
    an actuating means for positioning said focus of said objective in the sample;
    a computing device for controlling an autofocus process; and
    an positioning signal generator for generating an output signal for said computing device from a signal of said detector, said positioning signal generator being capable of controlling said actuating means.

13. The apparatus according to claim 12, further comprising an imaging detector, which is capable of an imaging mode of operation generating an imaging output from a detector area to said computing device and a focus mode of operation generating a separate output representing a focus score, and/or pixel values from a sub-area of said detector area.

14. The apparatus according to claim 10, further comprising a reflective layer disposed between a glass and a specimen of the sample.

* * * * *